Figure 3:
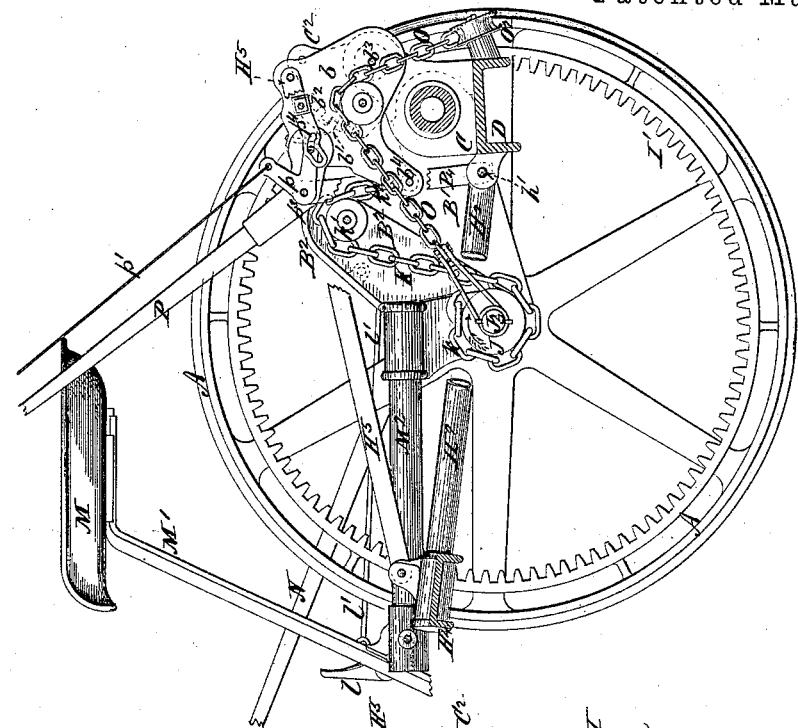

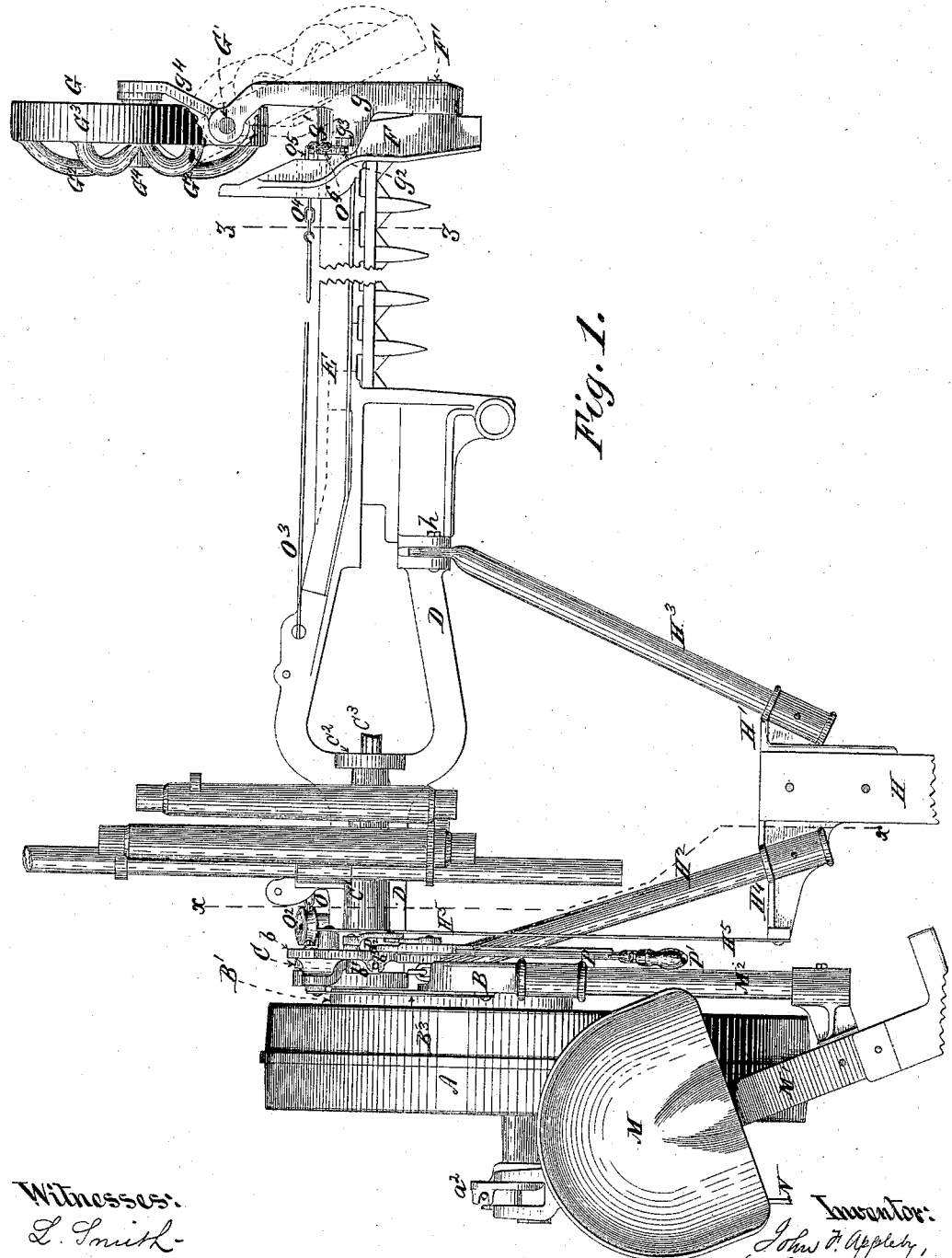

(Model.)

J. F. APPLEBY.
MECHANISM FOR SUPPORTING AND ADJUSTING THE ELEVATION OF HARVESTER PLATFORMS.

No. 314,774. Patented Mar. 31, 1885.

6 Sheets—Sheet 2.

(Model.)
J. F. APPLEBY.
MECHANISM FOR SUPPORTING AND ADJUSTING THE ELEVATION OF HARVESTER PLATFORMS.
No. 314,774.  Patented Mar. 31, 1885.
6 Sheets—Sheet 3.
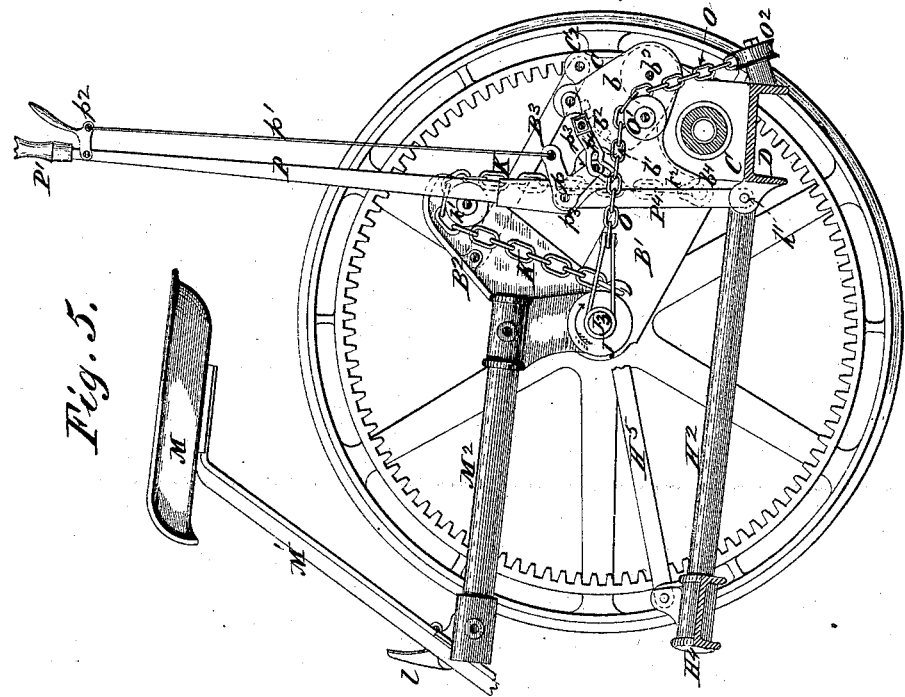
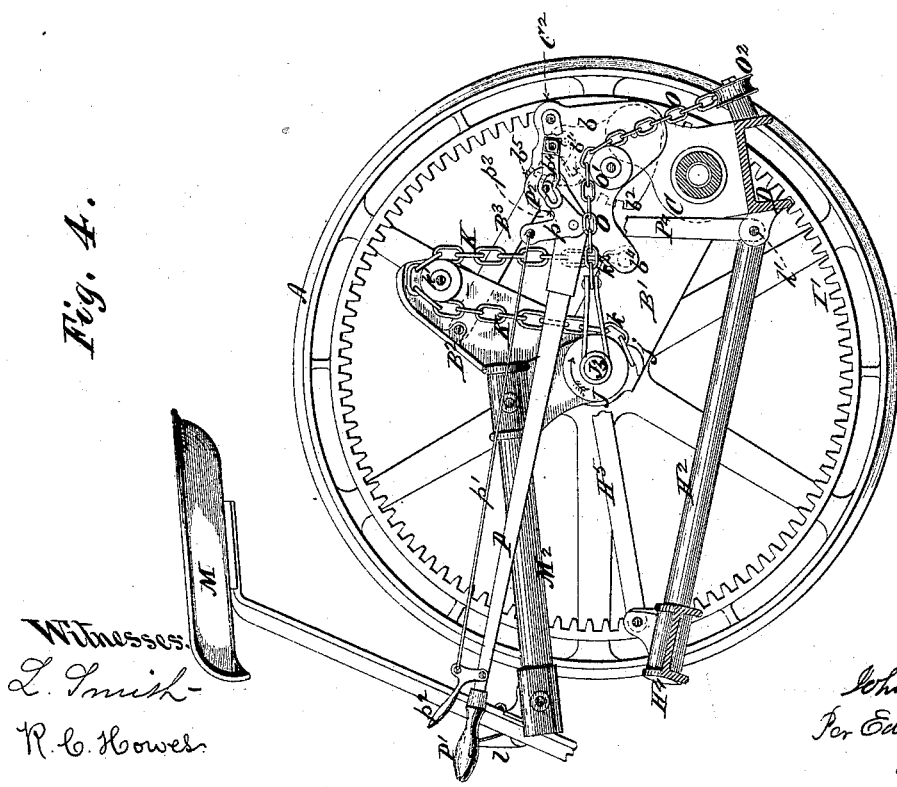

(Model.)
6 Sheets—Sheet 4.
J. F. APPLEBY.
MECHANISM FOR SUPPORTING AND ADJUSTING THE ELEVATION OF HARVESTER PLATFORMS.
No. 314,774.    Patented Mar. 31, 1885.
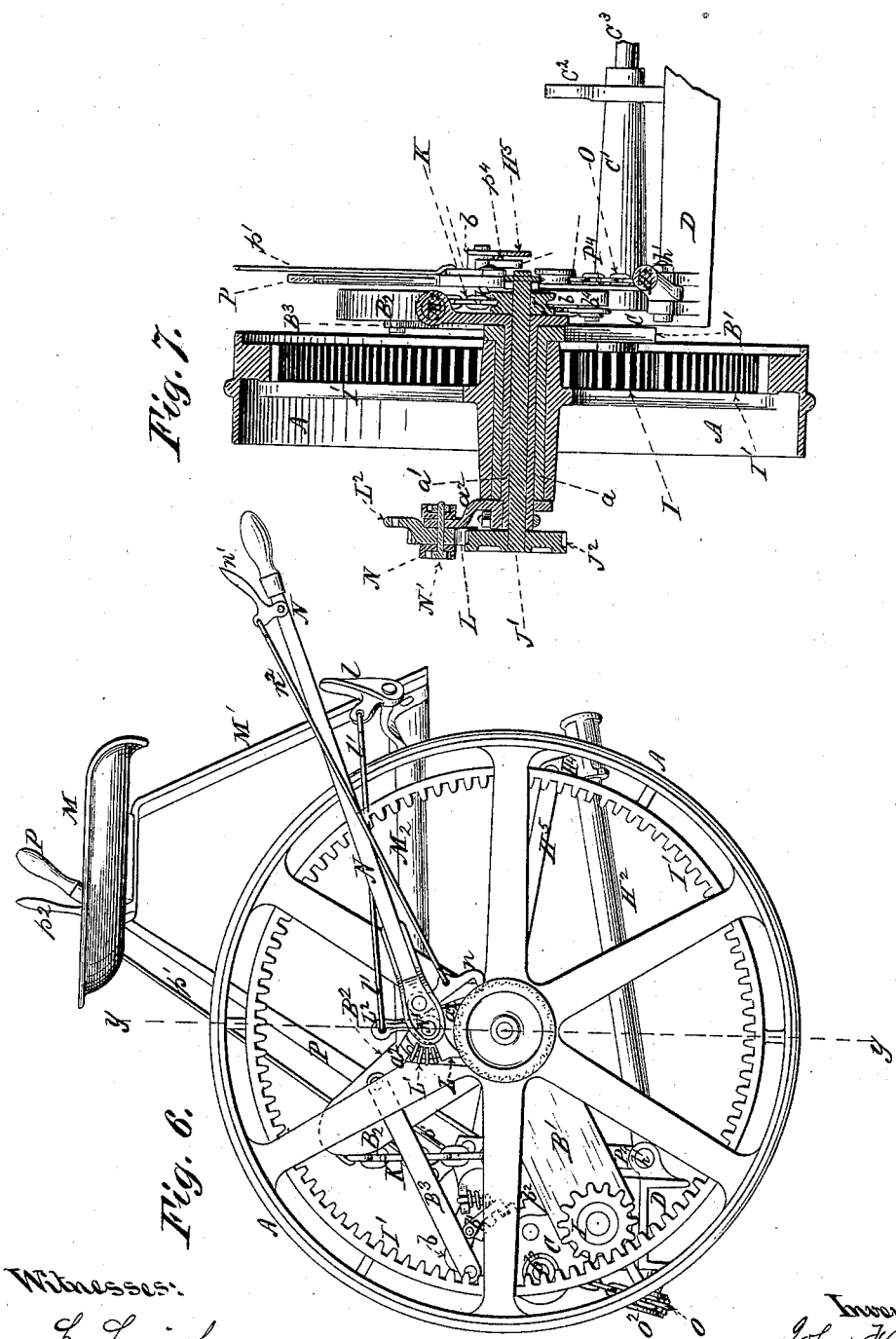

(Model.)

J. F. APPLEBY.
MECHANISM FOR SUPPORTING AND ADJUSTING THE ELEVATION OF HARVESTER PLATFORMS.

No. 314,774.

6 Sheets—Sheet 5.

Patented Mar. 31, 1885.

Witnesses:
L. Smith
R. C. Howes

Inventor:
John F. Appleby,
Per Edw. E. Quimby,
Atty.

(Model.)

J. F. APPLEBY.
MECHANISM FOR SUPPORTING AND ADJUSTING THE ELEVATION OF HARVESTER PLATFORMS.

6 Sheets—Sheet 6.

No. 314,774. Patented Mar. 31, 1885.

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

MECHANISM FOR SUPPORTING AND ADJUSTING THE ELEVATION OF HARVESTER-PLATFORMS.

SPECIFICATION forming part of Letters Patent No. 314,774, dated March 31, 1885.

Application filed July 31, 1884. (Model.)

*To all whom it may concern:*

Be it known that I, JOHN F. APPLEBY, of Minneapolis, Minnesota, have invented certain Improvements in Mechanism for Supporting and Adjusting the Elevation of Harvester-Platforms, of which the following is a specification.

My invention relates, first, to mechanism for enabling the driver of a harvester, while sitting in his seat, to raise and lower the platform; secondly, to mechanism by means of which the driver, while sitting in his seat, can tilt the platform in either direction; and, thirdly, to the construction of the grain-wheel, and to the instrumentality by means of which the grain end of the platform is supported upon the grain-wheel.

The first part of my invention consists in supporting the drive-wheel end of the platform upon the rear of a quadrilateral jointed frame, mounted edgewise upon and extending rearward from the axle of the drive-wheel. The rear end member of the quadrilateral frame is a standard affixed to and forming a part of the platform-frame or main frame of the harvester. A brace adjustably connected with the upper part of the rear end member of the quadrilateral frame extends forward and is pivoted to the pole-socket at a point which is forward of the axial line of the drive-wheel. The quadrilateral frame projects rearward from the axle of the drive-wheel, and supports the drive-wheel end of the platform at any desired elevation from the ground to which it may have been raised, so long as the members of the quadrilateral frame are prevented from turning upon their horizontal pivotal connections. The members of the quadrilateral frame are prevented from turning upon their horizontal pivotal connections by means of a chain, one end of which may, for the present, be considered as connected with the rear lower corner of said frame. This chain is thence led diagonally across the quadrilateral frame to a pulley pivoted upon the upper part of the front end member of the quadrilateral frame, which member is connected to and projects radially from the hollow axle of the drive-wheel. From this pulley the chain is led downward and fastened to a drum affixed to the inner end of a shaft which extends through the hollow axle of the drive-wheel and is provided upon its outer end with a ratchet-wheel, which engages a pivoted retaining-pawl carried upon the hollow axle. By means of a radius-bar centered upon the hollow axle and provided with an impelling-pawl, also engaging the ratchet-wheel referred to, the driver is enabled to turn the drum-shaft, and thereby to wind up the chain upon the drum, the retaining-pawl serving to check the backward rotation of the ratchet-wheel. By means of a pawl lifter attached to the radius-bar the driver is also enabled to lift the retaining-pawl out of engagement with the ratchet-wheel, and to thereby let the drum-shaft turn in the opposite direction and unwind the chain from the drum. The winding up of the chain upon the drum draws the rear lower corner of the quadrilateral frame toward the diagonally opposite corner of the said frame, and thus raises the machine from the ground. Correspondingly, the unwinding of the chain from the drum permits the distance between the same two diagonally-opposite corners of the quadrilateral frame to be increased, and the machine to be consequently lowered. The lower member of the quadrilateral frame is loosely mounted at its rear end upon a hollow stud projecting horizontally from a standard affixed to the platform-frame, the upper part of which standard constitutes the rear end member of the quadrilateral frame. This stud is made hollow to admit the counter-shaft, by which power to operate the machine is transmitted from the drive-wheel.

In Letters Patent granted to me, serially numbered 305,039, I have shown and described raising and lowering mechanism in which there is embodied a quadrilateral frame, the upper lateral member of which is hung at its rear end upon the axle of the drive-wheel, so that the frame projects forward from the axle of the drive-wheel instead of backward therefrom, as in the present case.

The second feature of my present invention relates to the tilting of the machine, which I effect by means of mechanism connected with the rear end of the quadrilateral frame, and operated by a bell-crank lever, the handle of which is conveniently near the driver's seat.

By the operation of this mechanism the members of the quadrilateral frame are made to turn upon their pivotal connections, thus varying the angles of the corners of the quadrilateral frame. As the rear end member of the quadrilateral frame is the standard rigidly connected with the platform-frame, its angle of variation from the perpendicular is by this means varied, and the tilt of the platform is consequently varied accordingly. The driver's seat is arranged upon the end of a bar connected with the hollow axle of the drive-wheel, and thus the weight of the driver is utilized to assist in counterbalancing the weight of the platform suspended upon the rear end of the quadrilateral frame. The grain end of the platform rises and falls simultaneously with the drive-wheel end thereof. This is effected by pivoting the grain end of the platform upon one end of an up-and-down rocking arm, the other end of which derives its support from the grain-wheel. To the upper side of the middle portion of this arm there is affixed a chain, which is led downward and under a pulley pivoted in the grain end of the platform-frame, and which is connected by means of a long link under the platform with another chain, which is led upward around a pulley upon the drive-wheel end of the platform-frame and over a pulley carried by the rear end member of the quadrilateral frame to a link hung upon the windlass-shaft. When the drive-wheel end of the platform is raised, the upper rear corner of the quadrilateral frame is projected backward, which increases the distance between the windlass-shaft and the pulley carried by the rear end member of the quadrilateral frame, and thus takes up the chain extending from the windlass-shaft to the said pulley. By this means the chain under the pulley at the grain end of the platform is drawn toward the drive-wheel, thereby raising this pulley and the grain end of the platform to which the pulley is pivoted. Similarly, when the drive-wheel end of the platform is lowered, the chain hung on the windlass-shaft is slacked, thus allowing the grain end of the platform to be correspondingly lowered.

The third feature of my invention relates to the construction of the grain-wheel, and of the up-and-down rocking arm, by means of which the grain end of the machine is supported upon the grain-wheel. This consists in providing the up-and-down rocking arm with a joint, by means of which the end of the rocking arm connected to the axle of the grain-wheel is given the capacity of rocking upon an axis at a right angle with the axial connection of the arm with the grain end of the platform-frame. The two members of the up-and-down rocking arm bend laterally, so that the joint which unites them is brought within the rim of the grain-wheel, the spokes of which are outwardly curved to allow clearance for the jointed ends of the two members of the up-and-down rocking arm.

Figure 2:
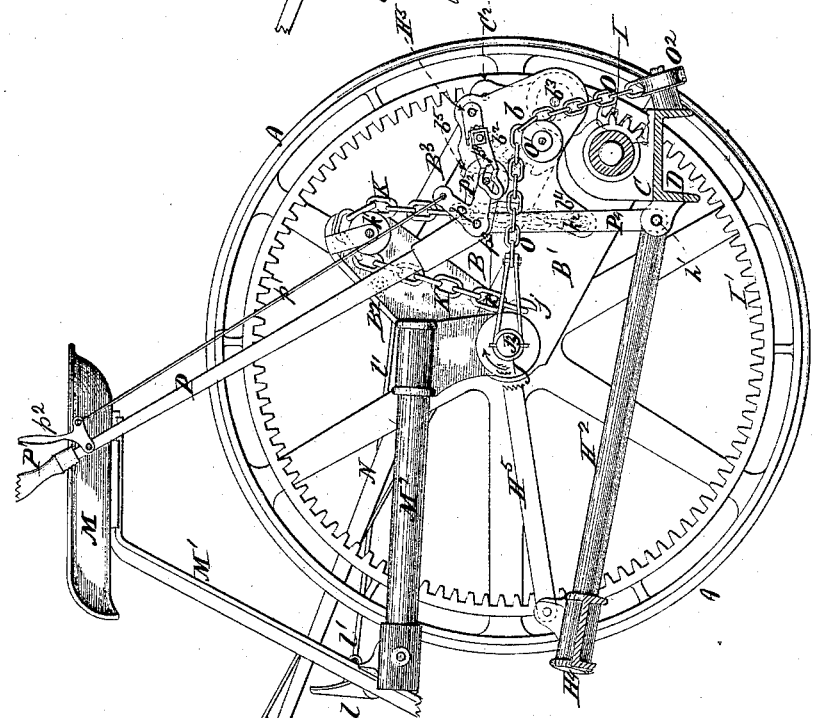
Figure 9:
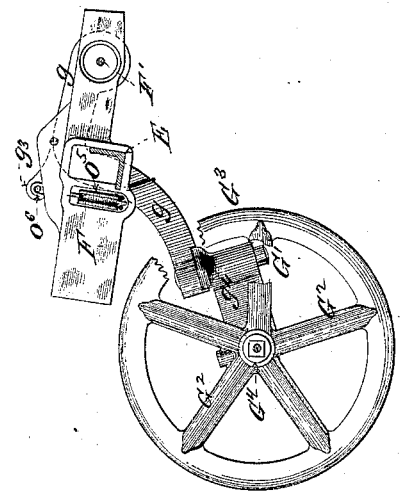
Figure 8:
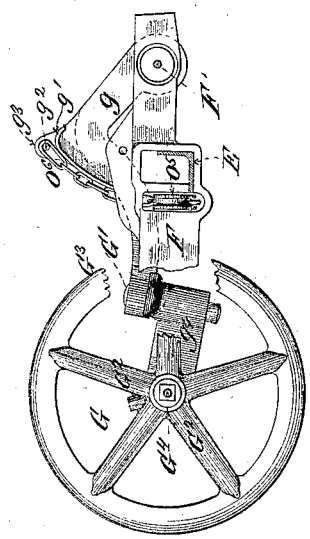
Figure 11:
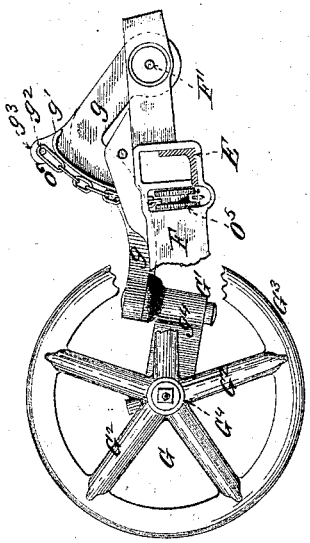
Figure 10:
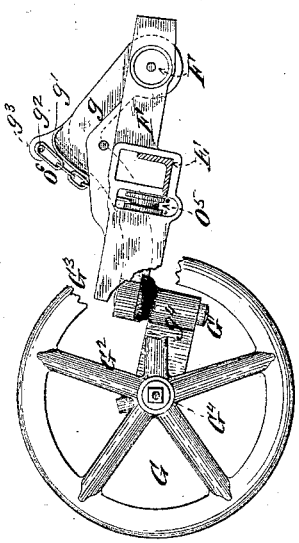

The accompanying drawings, representing so much of a harvester as is necessary for illustrating my improvements, are as follows:

Figure 1 is a top view of a portion of the platform-frame, showing the raising and lowering and tilting mechanism, the drive-wheel, the grain-wheel, and the driver's seat. Fig. 2 is a transverse vertical section through the line $x\,x$ on Fig. 1, showing the inner side of the drive-wheel in elevation, and showing the jointed quadrilateral frame dropped down. Fig. 3 is a similar section showing the said frame in its elevated position. Figs. 4 and 5 are transverse vertical sections through the line $x\,x$ on Fig. 1, showing the inner side of the drive-wheel in elevation, and respectively showing the tilting mechanism in two positions. Fig. 6 is an elevation of the drive-wheel end of the machine, and Fig. 7 is a vertical section through the line $y\,y$ on Fig. 6. Figs. 8 and 9 are transverse vertical sections through the line $z\,z$ on Fig. 1, illustrating, respectively, effects of the raising and lowering mechanism upon the grain end of the machine. Figs. 10 and 11 are vertical sections through the line $z\,z$ on Fig. 1, illustrating effects of the tilting mechanism upon the grain end of the machine.

The drawings represent a rear-cut harvester. The drive-wheel A supports the forward end of the jointed quadrilateral frame B, the rear end member, C, of which is a standard affixed to the drive-wheel end of the bed-plate D, constituting a part of the principal horizontal member of the platform-frame, the other part of which is the finger-bar E, rigidly affixed to the bed-plate D at one end, and at the other end to the cross-bar F at the grain end of the platform. The grain end of the platform is supported upon the grain-wheel G by means of the up-and-down rocking arm $g$, which at its forward end is connected with the cross-bar F by the horizontal pivot F'. The rear end of the pole H is secured to the pole-socket H', to the sides of which are secured the front ends of the rearwardly-diverging braces H² H³, the rear ends of which are suitably bent and perforated to receive the horizontal bolts $h\,h'$, respectively, by means of which they are pivoted to the bed-plate D. The pole-socket is provided with an extension, H⁴, to which is pivoted the forward end of the link H⁵, which extends therefrom rearwardly and upwardly, and at its rear end is pivotally connected with the upper corner of a rocking plate, $b$, which is pivoted to the standard or rear end member, C, of the quadrilateral frame, and is provided with a retaining-pawl, $b'$, which is adapted to engage the rack $b^2$, formed in the edge of a plate bolted to and constituting a part of the standard C, and curved concentrically with the pivot $b^3$, upon which the rocking plate $b$ rocks.

The quadrilateral jointed frame consists of the lower lateral member, B', the front end member, B², the rear end member, C, and the upper lateral member, B³. The lower lateral member, B', is a crank-arm rigidly affixed to the main axle $a$ of the drive-wheel. Near its rear end the arm B' has affixed to it the laterally-projecting hollow crank-pin C', which is provided with horizontal bearings in the standards C and $C^2$, erected upon the bed-plate D. The crank-pin C' is made hollow to admit the counter-shaft $C^3$, bearing upon its outer end the pinion I, which is rotated by the inside gear, I', affixed to the drive-wheel, and by means of which power is transmitted from the drive-wheel to drive the operative parts of the machine. The front end member, $B^2$, of the quadrilateral frame is an arm affixed to and projecting radially from the hollow shaft $a'$, contained in the main axle $a$. The upper lateral member, $B^3$, is pivoted at its forward end to the front end member, $B^2$, and at its rear end to the rear end member, C.

The windlass for raising and lowering the machine consists of the drum J, provided with the projecting spur $j$, upon which one end, $k$, of the windlass-chain K is hooked. The drum J is affixed to the windlass-shaft J', which extends through the hollow shaft $a'$, and at its outer end has affixed to it the ratchet-wheel $J^2$, the teeth of which are adapted to be engaged by a retaining-pawl, L, which is pivoted to an ear, $a^2$, affixed to the outer end of the hollow shaft $a'$. The pawl L is held against the periphery of the ratchet-wheel $J^2$ by the spiral spring L', but can be lifted out of engagement with the ratchet-wheel by means of the foot-lever $l$, pivoted to the arm which supports the driver's seat M, and connected by the link $l'$ to the tail end, $L^2$, of the pivoted pawl L.

The windlass is operated by means of the pawl-lever N, which is fulcrumed upon the pivot N', upon which the retaining-pawl L rocks. There is pivoted to the pawl-lever N the hooked pawl $n$, the hooked end of which is adapted to engage the teeth of the ratchet-wheel $J^2$; but may be lifted out of engagement therewith by means of the bell-crank lever $n'$, pivoted to the side of the pawl-lever N, near its outer end, and connected by means of the link $n^2$ with the impelling-pawl $n$. The normal position of the pawl-lever N is that in which it is represented in Fig. 6, with the handle inclined forward. When the driver desires to raise the machine, he pulls the pawl-lever upward toward the seat, and thus turns the windlass-shaft in the direction indicated by the arrow and winds up the windlass-chain K upon the drum J. The windlass-chain K is led upward from the spur $j$ and over the guide-pulley $k'$, which is pivoted to the side of the front member, $B^2$, of the quadrilateral frame near the upper end of the said member. From the guide-pulley $k'$ the windlass-chain is led downward across the quadrilateral frame and at its end $k^2$ is connected to the lower corner, $b^4$, of the oscillating plate $b$. By means of this connection the suspensory effect of the windlass-chain is exerted upon the rear end of the quadrilateral frame. The chain is prevented from unwinding from the drum by the action of the retaining-pawl L, pivotally supported upon the ear $a^2$, affixed to the hollow shaft $a'$, with which the front end member, $B^2$, of the frame is rigidly connected. It follows, therefore, that upon winding up the windlass-chain K upon the drum J the lower rear corner of the quadrilateral frame is drawn toward the front upper corner thereof. This is illustrated in Figs. 2 and 3, in which the latter shows the elevating effect produced by turning the windlass-drum J from the position in which it is represented in Fig. 2 to the position in which it is shown in Fig. 3, and thereby winding up the chain K upon it.

The raising and lowering of the grain end of the platform simultaneously with the drive-wheel end is effected by means of the chain O, which is hung upon the inner end of the windlass-shaft $J^2$, and is then led backward over a guide-pulley, O', pivoted to the side of the oscillating plate $b$, thence downward around a pulley, $O^2$, pivoted to the gear-frame, thence to the drive-wheel end of a long link, $O^3$, which extends under the platform, and at its opposite end is connected with a chain, $O^4$, which is led under the guide-pulley $O^5$, pivoted to the cross-bar F, thence upward over the curved face of the flange $g'$, cast upon the side of the rocking arm $g$. The end $O^6$ of the chain $O^4$ is hooked around the bolt $g^2$, inserted in the ear $g^3$, projecting upward from the upper part of the curved face of the flange $g'$, the curvature of which is concentric with the pivot F', upon which the arm $g$ rocks.

On reference to Figs. 2 and 3 it will be seen that the effect of elevating the quadrilateral frame is to increase the distance between the windlass-shaft $J^2$ and the guide-pulley O', pivoted to the rocking plate $b$. This increase in the distance of the pulley O' from the center of the drive-wheel has the effect of taking up the chain O and hauling the lower end of the chain $O^4$ toward the drive-wheel. As the pulley $O^5$ rests in the bight of the chain $O^4$ it is by this means raised upward toward the bolt $g^2$, to which the end $O^6$ of the chain $O^4$ is hooked, which has the effect of raising the cross-bar F at the grain end of the platform, which may by this means be raised from the position in which it is represented in Fig. 8 to the position in which it is represented in Fig. 9.

To lower the platform, the driver first raises the pawl-lever N, and then, having disengaged the retaining-pawl L by pressing forward the foot-lever $l$, lowers the pawl-lever N, and thus allows the drum J to turn in the direction opposite to that indicated by the curved arrow, thereby unwinding the chain K from the drum and lowering the rear end of the quadrilateral frame. This slacks the chain O, as has been described, and thus the grain end of the machine is correspondingly lowered.

Upon examination of the manner in which the platform is suspended it will be seen that in tilting it rocks upon the axis afforded by the hollow crank-pin C', and that the tilting of the platform in either direction involves a variation in the angle from the perpendicular of the standard C, which constitutes the rear end member of the quadrilateral frame. The upper end of the standard C is practically connected with the pole-socket H' by reason of the connection of the rear end of the link H⁵ with the upper corner of the rocking plate $b$. The weight of the forwardly-projecting pole, therefore, tends to rock the upper end of the standard C forward.

In considering the tilting operation of the platform the forward end of the pole may be regarded as a fixed fulcrum, and it will be observed that by rocking the rocking plate $b$, to which the rear end of the link H⁵ is pivoted, the distance between the upper end of the standard C and the pole-socket H' is varied, and thereby the deviation from the perpendicular of the standard C is correspondingly varied.

The rocking of the rocking plate $b$ for the purpose of varying the tilt of the machine is effected by means of the bell-crank lever P, the handle P' of which is within convenient distance of the driver's seat. The short arm P² of this bell-crank lever is pivoted to an ear, $b^6$, projecting radially outward from the edge of the rocking plate $b$, and at its elbow P³ the bell-crank lever is pivoted to the upper end of an eye-bar, P⁴, the lower end of which is pivoted to an ear projecting forward from the bed-plate D.

The disengagement of the retaining-pawl $b'$, pivoted in the rocking plate $b$, from the rack $b^2$, formed in the edge of the standard C, is effected by means of the bell-crank lever $p$, pivoted to the elbow of the bell-crank lever P, and connected by the link $p'$ with the hand-lever $p^2$, pivoted to the bell-crank lever P, in close proximity to the handle P'.

The arm $p^3$ of the bell-crank lever $p$ is provided with a laterally-projecting pin, which engages a suitably-curved slot formed in the arm $p^4$, affixed to and projecting radially from the shaft inserted through the rocking plate $b$, to which the retaining-pawl $b'$ is affixed. When the bell-crank lever P is thrown forward and downward, the machine is tilted forward and downward, as indicated by the inclined position of the bed-plate D, (shown in section in Fig. 4;) but by throwing the bell-crank lever upward into the position in which it is represented in Fig. 5 the distance between the upper end, C², of the standard C and the pole-socket H' is increased, and the angle of the upper lateral member, B³, of the quadrilateral frame has become less obtuse than it was when the parts were in the position in which they are represented in Fig. 4, thus slightly reversing the tilt of the machine, as indicated by the position in which the section of the bed-frame D is represented in Fig. 5.

In turning the rocking plate $b$ down from the position in which it is represented in Fig. 4 to that in which it is shown in Fig. 5 the distance between the lower corner, $b^4$, of the plate $b$ and the guide-pulley $k'$ is increased, thus making requisite a greater length of chain to extend from the guide-pulley $k'$ to the corner $b^4$ of the rocking plate $b$. This downward movement of the plate $b$ has therefore some elevating effect upon the rear end of the quadrilateral frame if the chain K is not unwound from the windlass. This effect, however, is lessened by the fact that the radius at which the end $k^2$ of the windlass-chain exerts its lifting effect upon the quadrilateral frame is increased by the act of turning down the rocking plate $b$. Thus, as will be seen on reference to the drawings, the distance between the end $k^2$ of the windlass-chain and the drum when the parts are in the elevated positions represented in Fig. 4 is considerably less than the distance between the same parts in the lower positions represented in Fig. 5. When the elevating effect produced by turning down the rocking plate $b$ is undesired, it is counteracted by letting the windlass-chain K unwind from the drum sufficiently to lower the platform the required distance.

The driver's seat M is supported upon the upper end of the inclined arm M', which is secured to the forward end of the arm M², rigidly connected with the front end member, B², of the quadrilateral frame. Thus the weight of the driver is utilized to assist in counterbalancing the weight of the machine suspended upon the rear end of the quadrilateral frame.

The object of the retaining-pawl $b'$ and the rack formed in the edge of the standard C is to hold the rocking plate $b$ in any position to which it may have been adjusted, so that the jarring of the parts, when the machine is at work, will not change the tilt of the machine.

The up-and-down rocking arm $g$ is composed of two members, the adjoining ends of which are pivoted together by the bolt G'. The adjoining ends of the members are bent laterally, so that their pivotal connection is brought within the rim G³ of the grain-wheel. The spokes G² of the grain-wheel are curved outwardly from the rim G³ to the hub G⁴, thus affording clearance for the jointed connection of the two members of the rocking arm G during the rotation of the grain-wheel. The rear member, $g^4$, of the jointed arm is affixed to the axle of the grain-wheel. By this construction the grain-wheel is permitted to swing laterally upon an axis, which is at a right angle with the axis of rotation of the grain-wheel, and with the axis of the pivot F', upon which the arm $g$ rocks. The axis upon which the grain-wheel swings laterally is within the rim of the grain-wheel, and the drawing or pushing strain upon the axle of the grain-wheel is always perpendicular to such axle and in line with the center of the tread of the grain-wheel.

The range of swinging lateral movement of the grain-wheel is illustrated in Fig. 1, in which the grain-wheel is represented in dotted lines in the position which it may assume when the grain end of the machine is turned backward.

I claim as my invention—

1. In mechanism for adjusting the height of the drive-wheel end of a harvester-platform, a quadrilateral jointed frame mounted edgewise upon the axle of the drive-wheel and projecting rearward therefrom, and connected at its rear end with the platform-frame, in combination with a windlass having its axis through the center of the drive-wheel, and a windlass-chain extending from the windlass-drum to the upper front corner of the quadrilateral frame, thence downward across the frame, and suitably connected with and exerting its suspensory effect upon the rear lower corner of the frame, and means for operating the windlass for taking up or letting off more or less of the windlass-chain, substantially as described.

2. The quadrilateral frame B, mounted edgewise upon and extending rearward from the axle of the drive-wheel, in combination with the pole H, pole-socket H', and the braces H² and H³, having suitable horizontal pivotal connections with the platform-frame, and the link H⁵, pivoted at its front end to the pole or pole-socket forward of the axial line of the drive-wheel, and at its rear end suitably connected with the upper part of the standard C, constituting the rear end member of the quadrilateral frame.

3. The quadrilateral frame B, mounted edgewise upon and extending rearward from the axle of the drive-wheel, and connected with the platform-frame, in combination with the arm M², rigidly connected with one of the members of the quadrilateral frame and projecting forward therefrom, and affording the support for the driver's seat M.

4. The quadrilateral frame mounted upon the axle of the drive-wheel, the platform-frame provided with the standard C, constituting the rear end member of the quadrilateral frame, the pole H, having a suitable jointed connection with the platform-frame, and the link H⁵, in combination with the windlass and windlass-chain K, and the adjustable rocking plate $b$, for varying the radial distance from the windlass-drum of the end $k^2$ of the windlass-chain fastened to the rocking plate $b$.

5. The quadrilateral frame mounted upon the axle of the drive-wheel, the platform-frame provided with the standard C, constituting the rear end member of the quadrilateral frame, the pole H, the pole-socket H', the braces H² and H³, and the link H⁵, in combination with the windlass and windlass-chain K, the rocking plate $b$, pivoted to the standard C and to the rear end of the link H⁵, the bell-crank lever P, having its short arm pivoted to the rocking plate $b$, its elbow pivotally connected by means of the eye-bar P⁴ to the platform-frame, the retaining-pawl $b'$, pivoted to the rocking plate $b$, and the rack $b^2$, forming a part of the standard C, as and for the purpose set forth.

6. The quadrilateral frame mounted upon and extending backward from the axle of the drive-wheel, and the guide-pulley O', pivoted to the rocking plate $b$, and a windlass for raising and lowering the rear end of the quadrilateral frame, in combination with the chain O, loosely hung upon the windlass-shaft in the center of the drive-wheel, and led therefrom over the pulley O' and downward around the pulley O², affixed to the platform-frame, and suitably connected with the chain O⁴, leading under the pulley O⁵ and extending upward, and having its end O⁶ suitably secured to the upper part of the up-and-down rocking arm $g$, as and for the purpose set forth.

7. The up-and-down rocking arm $g$, composed of two members, one having a horizontal pivotal connection with the grain-wheel and the other affixed to the axle of the grain-wheel, and having their adjoining ends bent laterally and united by a bolt which is within the rim of the grain-wheel, the spokes of the grain-wheel being suitably curved to allow clearance for the jointed ends of the two members of the up-and-down rocking arm, substantially as set forth.

JOHN F. APPLEBY.

Witnesses:
C. M. CASTLE,
HENRY HOUKOMP.